(12) United States Patent
Qu

(10) Patent No.: US 11,685,972 B2
(45) Date of Patent: Jun. 27, 2023

(54) NI-BASED ALLOY AND VALVE

(71) Applicant: Huaiji Valve USA Inc, Aurora, IL (US)

(72) Inventor: Rong Qu, Dunlap, IL (US)

(73) Assignee: HUAIJI VALVE USA INC, Aurora, IL (US)

( * ) Notice: Subject to any disclaimer, the term of this patent is extended or adjusted under 35 U.S.C. 154(b) by 0 days.

(21) Appl. No.: 17/527,144

(22) Filed: Nov. 15, 2021

(65) Prior Publication Data

US 2022/0154312 A1 May 19, 2022

Related U.S. Application Data

(60) Provisional application No. 63/115,990, filed on Nov. 19, 2020.

(51) Int. Cl.
C22C 19/05 (2006.01)
F16K 1/36 (2006.01)

(52) U.S. Cl.
CPC .............. *C22C 19/056* (2013.01); *F16K 1/36* (2013.01)

(58) Field of Classification Search
CPC ................................. C22C 19/056; C22F 1/10
See application file for complete search history.

(56) References Cited

U.S. PATENT DOCUMENTS 6,458,318 B1 * 10/2002 Nishiyama ............ C22C 19/055
420/447
2020/0102629 A1 4/2020 Veliz et al.

FOREIGN PATENT DOCUMENTS

WO WO-2020245575 A1 * 12/2020 ......... B23K 35/3033

* cited by examiner

*Primary Examiner* — Jessee R Roe
(74) *Attorney, Agent, or Firm* — Fideli Law PLLC

(57) ABSTRACT

The present disclosure provides a Ni-based alloy and a valve made of the same. The Ni-based alloy includes, on a weight basis: about 14%-17% Cr, about 4%-6% Al, about 1.0%-1.5% Ti, about 8%-11% Co, about 6%-9% W, about 0.5%-1.5% Ta, no more than about 0.25% Fe, about 0-2.0% Mo, about 0.07%-0.18% C, about 0.01%-0.03% Zr, about 0.005%-0.015% B, a balance of Ni, and incidental impurities. The Ni-based alloy, when used to fabricate engine valves, may significantly improve the corrosion resistance and oxidation resistance of the engine vales. The engine valves may also possess other desirable properties, such as high fatigue strength, high tensile strength and good weldability. The engine valves may also have extended useable life. The cost for manufacturing such engine valves may also be reduced.

20 Claims, 4 Drawing Sheets

NI-BASED ALLOY AND VALVE

RELATED APPLICATIONS

The present patent document claims the benefit of the filing date under 35 U.S.C. § 119(e) of Provisional U.S. Patent Application Ser. No. 63/115,990, filed on Nov. 19, 2020, which is hereby incorporated by reference.

TECHNICAL FIELD

The present disclosure relates generally to an alloy, and, more particularly, to a Ni-based alloy for casting engine valves.

BACKGROUND

An internal combustion engine typically includes one or more valves that allow fresh air to enter a combustion chamber of the engine and/or allow exhaust gases to exit from the combustion chamber. These engine valves, particularly the exhaust valves, are subjected to extremely high temperatures during operation. The working environment for valves is harsh, especially for the exhaust valves. Due to the large amount of heat released during fuel combustion in the combustion chamber, the surface of exhaust valves may reach temperature about 800° C. or higher (e.g., from about 800° C. to about 1,000° C.). Conventional materials used to make the engine valves may survive such high temperatures for a relatively short period of time, for example, up to about 2,000 hours at a temperature of about 800° C. to about 1,000° C. After 2,000 hours, the strength of the valves drops sharply, and the valves may need to be repaired or replaced. Therefore, it is desirable to increase the service life of the engine valves. For example, it may be desirable to increase the service life of engine valves to between about 20,000 hours and about 30,000 hours.

Engine valves are typically made of wrought alloys, such as Ni-base alloys, and are typically manufactured using a forging or casting process. Changing the composition of the wrought material to increase its ability to withstand high temperatures usually reduces the ductility of the material, making it harder to use manufacturing processes like forging, rolling, and/or extrusion. Furthermore, the reduced ductility may also cause cracking of the valves during manufacture, significantly reducing yield and increasing manufacturing costs.

Conventional alloys Inconel 751, Pyroment 31V and Nimonic 80A are widely used in for making engine valves today. However, once the operating temperature reaches beyond 800° C., the strength of these materials reduces rapidly and become non-sustainable in engines. For cast alloys such Inconel 713 LC, Mar-M246 and even single crystal can be used as high as 1050° C., and have been widely used for turbine blade materials. However due to high cost of casting, as well as difficulties of subsequent processing such as welding and machining, these materials have not been used for engine valve materials.

SUMMARY

The present disclosure aims to at least solve the technical problems existing in the conventional technology.

The present disclosure relates generally to a Ni-based alloy, when used to cast engine valves, may significantly improve the engine valves' corrosion resistance and oxidation resistance. The engine valves may also possess other desirable properties, such as high fatigue strength, high tensile strength and good weldability. The engine valves may also have extended useable life. The cost for manufacturing such engine valves may also be reduced.

In some aspects, a Ni-based alloy for casting engine valves is provided. The Ni-based alloy including, on a weight basis: about 14%-17% Cr, about 4%-6% Al, about 1.0%-1.5% Ti, about 8%-11% Co, about 6%-9% W, about 0.5%-1.5% Ta, no more than about 0.25% Fe, about 0%-2.0% Mo, about 0.07%-0.18% C, about 0.01%-0.03% Zr, about 0.005%-0.015% B, a balance of Ni, and incidental impurities.

In some exemplary embodiments, the Ni-based alloy may include 30%-40% $\gamma'$ phase by weight at about 1000° C.

In some exemplary embodiments, the Ni-based alloy may include about 14.5%-15.5% Cr by weight.

In some exemplary embodiments, the Ni-based alloy may include about 4.5%-5.5% Al by weight.

In some exemplary embodiments, the Ni-based alloy may include about 1.25%-1.40% Ti by weight.

In some exemplary embodiments, the Ni-based alloy may include about 0.015%-0.025% Zr by weight.

In some exemplary embodiments, the Ni-based alloy may include about 0.55%-1.25% Ta by weight.

In some exemplary embodiments, the Ni-based alloy including, on a weight basis: about 14.8%-15.2% Cr, about 4.8%-5.2% Al, about 1.28%-1.35% Ti, about 9%-10% Co, about 7%-8% W, about 0.85%-1.15% Ta, no more than about 0.15% Fe, about 1.0%-1.5% Mo, about 0.08%-0.12% C, about 0.018%-0.022% Zr, about 0.008%-0.012% B, a balance of Ni, and incidental impurities.

In some exemplary embodiments, the Ni-based alloy including, on a weight basis: about 15% Cr, about 5% Al, about 1.3% Ti, about 9.5% Co, about 7.5% W, about 1.0% Ta, about 0.13% Fe, about 1.0% Mo, about 0.1% C, about 0.02% Zr, about 0.01% B, a balance of Ni, and incidental impurities.

In some aspects, the present disclosure provides a valve, including a valve head attached to a valve stem. The valve head and the valve stem may be made of a material including a Ni-based alloy, the Ni-based alloy including, on a weight basis: about 14%-17% Cr, about 4%-6% Al, about 1.0%-1.5% Ti, about 8%-11% Co, about 6%-9% W, about 0.5%-1.5% Ta, no more than about 0.25% Fe, about 0%-2.0% Mo, about 0.07%-0.18% C, about 0.01%-0.03% Zr, about 0.005%-0.015% B, a balance of Ni, and incidental impurities.

In some exemplary embodiments, the valve including the Ni-based alloy may include about 14.5%-15.5% Cr by weight.

In some exemplary embodiments, the valve including the Ni-based alloy may include about 4.5%-5.5% Al by weight.

In some exemplary embodiments, the valve including the Ni-based alloy may include about 1.25%-1.40% Ti by weight.

In some exemplary embodiments, the valve including the Ni-based alloy may include about 0.015%-0.025% Zr by weight.

In some exemplary embodiments, the valve including the Ni-based alloy may include about 0.55%-1.25% Ta by weight.

In some exemplary embodiments, the valve including the Ni-based alloy including, on a weight basis: about 14.8%-15.2% Cr, about 4.8%-5.2% Al, about 1.28%-1.35% Ti, about 9%-10% Co, about 7%-8% W, about 0.85%-1.15% Ta, no more than about 0.15% Fe, about 1.0%-1.5% Mo, about 0.08%-0.12% C, about 0.018%-0.022% Zr, about 0.008%-0.012% B, a balance of Ni, and incidental impurities.

In some exemplary embodiments, the valve including the Ni-based alloy including, on a weight basis: about 15% Cr, about 5% Al, about 1.3% Ti, about 9.5% Co, about 7.5% W, about 1.0% Ta, about 0.13% Fe, about 1.0% Mo, about 0.1% C, about 0.02% Zr, about 0.01% B, a balance of Ni, and incidental impurities.

In some exemplary embodiments, the valve is an exhaust valve or an intake valve.

By optimizing and adjusting the contents of various elements, such as Cr, the Ni-based alloy of the present disclosure not only possesses excellent high-temperature corrosion resistance and oxidation resistance, but also has good mechanical properties, weldability, and reduced manufacturing cost. The valves made from the Ni-based alloy according to the present disclosure may have a service life, under about 1,000° C., ranging from about 10,000 hours to 30,000 hours, suitable for industrial applications.

BRIEF DESCRIPTION OF THE DRAWINGS

The foregoing and/or additional aspects and advantages of the present disclosure will become more apparent and understandable in descriptions of the exemplary embodiments in combination with the accompanying drawings.

DETAILED DESCRIPTION

Figure 1:
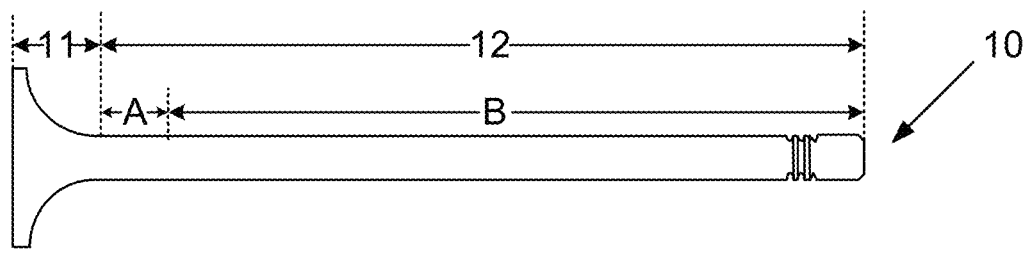
FIG. 1 is a diagrammatic illustration of a valve according to some exemplary embodiments of the present disclosure.

The following description provides specific application scenarios and requirements of the present application in order to enable those skilled in the art to make and use the present disclosure. Various modifications to the disclosed embodiments will be apparent to those skilled in the art. The general principles defined herein may be applied to other embodiments and applications without departing from the spirit and scope of the disclosure. Therefore, the present disclosure is not limited to the embodiments shown, but the broadest scope consistent with the claims.

The terminology used herein is for the purpose of describing particular exemplary embodiments only and is not intended to be limiting. When used in this disclosure, the terms "comprise", "comprising", "include" and/or "including" refer to the presence of stated features, integers, steps, operations, elements, and/or components, but do not preclude the presence or addition of one or more other features, integers, steps, operations, elements, components, and/or groups thereof. As used in this disclosure, the term "A on B" means that A is directly adjacent to B (from above or below), and may also mean that A is indirectly adjacent to B (i.e., there is some element between A and B); the term "A in B" means that A is all in B, or it may also mean that A is partially in B.

In view of the following description, these and other features of the present disclosure, as well as operations and functions of related elements of the structure, and the economic efficiency of the combination and manufacture of the components, may be significantly improved. All of these form part of the present disclosure with reference to the drawings. However, it should be clearly understood that the drawings are only for the purpose of illustration and description, and are not intended to limit the scope of the present disclosure. It is also understood that the drawings are not drawn to scale.

In some exemplary embodiments, numbers expressing quantities or properties used to describe or define the embodiments of the present application should be understood as being modified by the terms "about", "generally", "approximate," or "substantially" in some instances. For example, "about", "generally", "approximately" or "substantially" may mean a ±20% change in the described value unless otherwise stated. Accordingly, In some exemplary embodiments, the numerical parameters set forth in the written description and the appended claims are approximations, which may vary depending upon the desired properties sought to be obtained in a particular embodiment. In some exemplary embodiments, numerical parameters should be interpreted in accordance with the value of the parameters and by applying ordinary rounding techniques. Although a number of embodiments of the present application provide a broad range of numerical ranges and parameters that are approximations, the values in the specific examples are as accurate as possible.

Each of the patents, patent applications, patent application publications, and other materials, such as articles, books, instructions, publications, documents, products, etc., cited herein are hereby incorporated by reference, which are applicable to all contents used for all purposes, except for any history of prosecution documents associated therewith, or any identical prosecution document history, which may be inconsistent or conflicting with this document, or any such subject matter that may have a restrictive effect on the broadest scope of the claims associated with this document now or later. For example, if there is any inconsistent or conflicting in descriptions, definitions, and/or use of a term associated with this document and descriptions, definitions, and/or use of the term associated with any materials, the term in this document shall prevail.

It should be understood that the embodiments of the application disclosed herein are merely described to illustrate the principles of the embodiments of the application. Other modified embodiments are also within the scope of this application. Therefore, the embodiments disclosed herein are by way of example only and not limitations. Those skilled in the art may adopt alternative configurations to implement the invention in this application in accordance with the embodiments of the present application. Therefore, the embodiments of the present application are not limited to those embodiments that have been precisely described in this disclosure.

To make the objective, features, and advantages of the present disclosure more comprehensible, the following further describes the present disclosure in detail with reference to accompanying drawings and specific embodiments. It should be noted that under a condition that no conflict occurs, the embodiments of this application and features in the embodiments may be mutually combined.

A plurality of specific details is described in the following description for fully understanding the present disclosure. However, the present disclosure may be further implemented in other manners different from the manner described herein. Therefore, the protection scope of the present disclosure is not limited by the following disclosed specific embodiments.

FIG. 1 illustrates a valve 10 according to some exemplary embodiment of the present disclosure. The valve 10 may be used in any types of engine such as a two-stroke or four-stroke diesel or gasoline engine, a two-stroke or four-stroke gaseous-fuel powered engine, or a two-stroke or four-stroke dual-fuel powered engine. The valve 10 may be located in the combustion chamber. The valve 10 may be an intake valve or an exhaust valve. A mixture of fuel and air may enter the combustion chamber via an intake valve. After combustion, the exhaust gas may leave the combustion chamber via the exhaust valve. Valve 10 may include a valve head 11 attached to a valve stem 12. The valve stem 12 may further include a section A and a section B. The section A refers to the part of valve stem 12 attached to the valve head 11, and the section B refers to the rest of valve stem 12, as shown in FIG. 1. The section A may be made of the material as the valve head 11. Thus, larger section A results in higher the manufacturing costs associate with valve 10. Thus, the size of section A should be in an optimized range. In some exemplary embodiments according to the present disclosure, the length of section A may be selected as needed. Section B may be made of different materials from section A.

In some exemplary embodiments, section A and section B may include the same material. In some exemplary embodiments, section A and the valve head 11 may include the same material; that is, the valve head 11 and the valve stem 12 may include the same material. In some exemplary embodiments, section A and the valve head 11 may include the same material, while the material of the valve head 11 may be different, that is, the materials of the valve head 11 and the valve stem 12 are different. In some exemplary embodiments, the valve head 11 and section A may include the same material, while section B may include a different material.

The valve head 11 and section A may be integrally formed or may be formed separately and then connected together. Similarly, section A and section B may be integrally formed, or may be formed separately and then connected together. The connection may be a fixed connection or a detachable connection. Non-limiting exemplary fixed connections may include welding, riveting, or bonding. The welding may be laser welding, electronic beam welding, arc welding, or ultrasonic welding. Non-limiting exemplary detachable connection may include a threaded connection, a key connection, a snap connection, or a hinge connection. In some exemplary embodiments, the valve head 11 and section A are integrally formed. Section A and section B are connected by welding.

The valve head 11 may include a surface. Non-limiting exemplary surfaces may include a flat top surface, a spherical top surface, or a trumpet-shaped top surface. The structure of a flat top valve head is simple, thus is convenient to manufacture and has a small heat absorption area and a small mass. A valve with a flat top surface may be used for intake and/or exhaust valves. A valve with a spherical top may be more suitable as an exhaust valve. The spherical top valve may possess high strength, small exhaust resistance, and good exhaust gas elimination effect. However, the spherical top valve may have a larger top heating area, as well as large mass and inertia. The manufacturing processing for a valve with spherical top may also be more complicated than that of a flat top valve. A valve with a trumpet-shaped surface is streamlined, which may reduce the intake air resistance force. However, a trumpet-shaped top surface has a large area exposed to heat, thus a valve with such top surface is only suitable to be used as an intake valve. In some exemplary embodiments according to the present disclosure, the valve may have a flat top surface. The valve stem 12 may be cylindrical and exhibit reciprocating motion within the valve guide. The surface of valve stem 12 may be heat-treated and polished.

Since the valve head 11 and section A are closer to the engine combustion chamber, the valve head 11 and section A are required to be able to withstand high temperatures (above 800° C.). Since fuel may contain sulfur, sulfur may further react and form sulfur oxides ($SO_x$). The sulfur oxides may encounter water molecules and form sulfuric acid, which will corrode valve material and reduce the service life of the valve. Therefore, it is necessary to adjust the material composition of the valve to improve the valve performance, corrosion resistance and oxidation resistance.

In some exemplary embodiments according to the present disclosure, the valve 10 may be an intake valve or an exhaust valve. The valve head 11 and section A may be made of a Ni-based alloy. In exemplary embodiments according to the present disclosure, the Ni-based alloy may also be used as the material of section B. The Ni-base alloy may include Cr, Al, Ti, Co, W, Ta, Fe, Mo, C, Zr, B, and Ni, and incidental impurities. By adjusting the relative proportions of some elements, the Ni-base alloy may have excellent corrosion resistance and oxidation resistance at high temperatures, while may still be capable of maintaining good mechanical properties and weldability. The elements in the Ni-based alloy and their relative proportions will be described in detail below. For the convenience of description, the elements are discussed separately. However, it should be noted that the interactions between elements may exist. Thus, an element should not be separated from the overall Ni-based alloy composition to study the role of the element in the Ni-based alloy.

The addition of Cr may benefit the corrosion resistance and oxidation resistance of Ni-based alloy. When the contents of other components in the Ni-based alloy are held constant, the increasing of Cr in the Ni-based alloy may result in increased corrosion resistance and oxidation resistance. However, the mechanical strength of the Ni-based alloy may decrease accordingly. Thus, Cr content may be optimized to be within a suitable range to balance the corrosion and oxidation resistance with mechanical strength. In some exemplary embodiments according to the present disclosure, the Ni-based alloy may include Cr, on a weight basis, from about 14% to 17%. This range is optimized so that the Ni-base alloy may have excellent corrosion resistance and oxidation resistance as well as mechanical strength. In some exemplary embodiments according to the present disclosure, the weight percentage of Cr in the Ni-based alloy may be about 14%, about 14.1%, about 14.2%, about 14.3%, about 14.4%, about 14.5%, about 14.6%, about 14.7%, about 14.8%, about 14.9%, about 15.0%, about 15.1%, about 15.2%, about 15.3%, about 15.4%, about 15.5%, about 15.6%, about 15.7%, about 15.8%, about 15.9%, about 16.0%, about 16.1%, about 16.2%, about 16.3%, about 16.4%, about 16.5%, about 16.6%, about 16.7%, about 16.8%, about 16.9%, or about 17.0%, or within a range between any of the foregoing contents. In some exemplary embodiments, when the weight percentage of Cr of the Ni-base alloy is between about 14.5% and about 15.5%, an optimal balance exhibits between the oxidation resistance, corrosion resistance, and mechanical strength. In some exemplary embodiments, the weight percentage of Cr in the Ni-base alloy may be between about 14.8% and about 15.2%. In some exemplary embodiments, the weight percentage of Cr in the Ni-base alloy may be about 15%, the Ni-based alloy has the optimal balance between oxidation resistance, corrosion resistance, and mechanical strength.

While the Ni-based alloy having a high Cr content may exhibit improved corrosion resistance and oxidation resistance, adjusting the compositions of the other elements may be beneficial to maximize the mechanical strength of the Ni-based alloy. Mechanical strength may be related to the content of γ' phase ($Ni_3$ (Ti, Al)) present within the Ni-based alloy. A γ' phase may be based on an intermetallic compound including Ni, aluminum (Al) and titanium (Ti). Generally, a Ni-based alloy with high γ' phase content may exhibit high mechanical strength. Although the γ' phase contributes to mechanical strength, more γ' phase may require more aluminum, titanium, and other elements, which may increase the solidification temperature range. The solidification temperature range refers to the temperature range where Ni-based alloys change from a fully liquid state to a fully solid state. A large solidification temperature range may result in the formation of micropores within the solidified Ni-based alloy. Micropores may increase the stress concentration of the solidified alloy thus reducing the service life of the Ni-based alloy valve. Hence, the amount of γ' phase in the alloy must be balanced to ensure that the alloy has adequate mechanical strength and a small solidification temperature range. In some exemplary embodiments, at a working temperature of about 900° C., the Ni-based alloy may include γ' phase, on a weight basis, about 40%, about 41%, about 42%, about 43%, about 44%, about 45%, about 46%, about 47%, about 48%, about 49%, or about 50%. At a working temperature of about 1,000° C., the Ni-based alloy may include γ' phase, on a weight basis, about 30%, about 31%, about 32%, about 33%, about 34%, about 35%, about 36%, about 37%, about 38%, about 39%, or about 40%.

Al is a strengthening phase in the Ni-based alloy. Al, Ni, and Ti together form the γ' phase. The γ' phase may be coherent or semi-coherent with the γ phase in the Ni-based alloy and increase the mechanical strength of the Ni-based alloy. Further, the addition of Al can improve the oxidation resistance of the Ni-based alloy. At high temperature, Al reacts with $O_2$ and forms a dense oxide film, thereby preventing the interior of the Ni-based alloy from contacting $O_2$ and avoiding further oxidation of the Ni-based alloy. The relative proportion of Al in the Ni-base alloy directly affect the weight percentage of γ' phase, thereby affecting the mechanical strength of the Ni-based alloy. Generally, higher Al content would result in greater precipitation of γ' phase, which may result in higher mechanical strength of the Ni-based alloy. However, the processing difficulty may increase as Al weight percentage increases within the Ni-based alloy because the alloy may become prone to cracking during manufacturing due to high Al content. Thus, it may be necessary to optimize the relative proportion of Al within the Ni-based alloy. In some exemplary embodiments according to the present disclosure, the Ni-based alloy may include Al, on a weight basis, from about 4% to about 6%, to balance mechanical strength and processability. In some exemplary embodiments, the Ni-based alloy may include Al, on a weight basis, about 4.0%, about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4%, about 5.5%, about 5.6%, about 5.7%, about 5.8%, about 5.9%, or about 6.0%. In some exemplary embodiments, when the weight percentage of Al of the Ni-base alloy is between about 4.5% and about 5.5%, a balance exists between mechanical strength and processability. In some exemplary embodiments, when the weight percentage of Al of the Ni-based alloy is between about 4.8% and about 5.2%, or about 5%, an optimal balance may be achieved between mechanical strength and processability.

Ti may be easily dissolved in γ' phase. Thus, Ti may be one of the main constituents of γ' phase. Generally, Ti may assist the formation of the γ' phase within the Ni-base alloy and increase the mechanical strength of the Ni-based alloy. When Ti is incorporated into the γ' phase, the precipitation of the γ' phase may be slowed down so as to prevent over-aging of the Ni-based alloy, thus extending the service life of Ni-based alloys in high temperature environments. However, the alloy with high Ti content may exhibit reduced oxidation resistance. Excess Ti may combine with Ni to form η phase ($Ni_3Ti$), and η phase doesn't have the ability of precipitation hardening. Therefore, it may be necessary to adjust the weight percentage of Ti to an appropriate value to maximize the mechanical strength and oxidation resistance of the Ni-based alloy. When Al weight percentage is higher than Ti weight percentage, it is possible to maintain high γ' phase by weight. In some exemplary embodiments, the Ni-based alloy may include Ti, on a weight basis, from about 1.0% to about 1.5%. In some exemplary embodiments, the Ni-based alloy may include about 1%, about 1.05%, about 1.10%, about 1.15%, about 1.20%, about 1.25%, about 1.30%, about 1.35%, about 1.40%, about 1.45%, or about 1.50% Ti. In some exemplary embodiments, when the Ni-based alloy including about 1.25%-about 1.40% Ti, or about 1.28%-about 1.35%, or about 1.3% Ti, an optimal balance of mechanical strength and oxidation resistance may exist.

The Ni-based alloy may include Zr. Zr is a strong carbide forming agent, and may assist with degassing, purification and grain refinement of the alloy, which may improve low temperature properties, drawability, and machinability of the Ni-base alloy. A small amount of Zr may benefit machinability of the Ni-base alloy without compromising the other properties. In some exemplary embodiments, the Ni-based alloy may include Zr, on a weight basis, between about 0.01% and about 0.03%, between about 0.015% and about 0.025%, or between about 0.018% and about 0.022%. In some exemplary embodiments, the Ni-based alloy may include about 0.01%, about 0.015%, about 0.02%, about 0.025%, or about 0.03% Zr. In some exemplary embodiments, the Ni-based alloy may include about 0.02% Zr.

The Ni-based alloy may include Ta. Ta has a relatively large atomic radius, thus the incorporation of Ta may result in increased γ' phase lattice constant. Ta will not affect the plasticity of the Ni-based alloy, yet it may also increase the creep strength of the Ni-based alloy. Ta may also prevent local precipitation of carbides at grain boundaries. In some exemplary embodiments according to the present disclosure, the Ni-based alloy may include Ta, on a weight basis, between about 0.5% and about 1.5%, between about 0.55% and about 1.25%, or between about 0.85% and about 1.15%. In some exemplary embodiments according to the present disclosure, the Ni-based alloy may include about 0.5%, about 0.55%, about 0.60%, about 0.65%, about 0.70%, about 0.75%, about 0.85%, about 0.90%, about 1.0%, about 1.05%, about 1.10%, about 1.15%, about 1.20%, about 1.25%, about 1.30%, about 1.35%, about 1.40%, about 1.45%, or about 1.5% of Ta. In some exemplary embodiments according to the present disclosure, the Ni-based alloy may include about 1.0% Ta.

Co and Ni in the Ni-based alloy can form a continuous substitution solid solution to become (Ni, Co)$_3$(Al, Ti) to strengthen the γ' phase, thereby improving the high-temperature performance of the Ni-based alloy. The Ni-base alloy with high Co weight percent may have high strength and creep resistance, at the same time provide a high γ' phase solid solution temperature and increase the flexibility of heat treatment process and minimize thermally induced voids. However, the increase of weight percentage of Co may induce the formation of Ni$_3$Ti phase of HCP-D024 structure, and the presence of this phase will decrease the strength of Ni-based alloy. In some exemplary embodiments, the Ni-based alloy may include Co, on a weight basis, between about 8% and about 11%, or between about 9% and about 10%. In some exemplary embodiments according to the present disclosure, the Ni-based alloy may include Co, on a weight basis, about 8%, about 8.5%, about 9.0%, about 9.5%, about 10.0%, about 10.5%, or about 11.0%. In some exemplary embodiments according to the present disclosure, the Ni-based alloy may include about 9.5% Co.

W is a solid solution strengthening agent in the Ni-based alloy. W has a large solid solubility in γ phase, which may affect the lattice constant and elastic modulus of the γ phase and may strengthen the solid solution. However, high W concentration may promote the formation of TCP phase (Topologically Close-Packed phase). The TCP phase is a common precipitation phase in Ni-based, cobalt-based, or iron-based superalloys and austenitic stainless steels. In some exemplary embodiments, the Ni-based alloy may include W, on a weight basis, between about 6% and about 9%, or between about 7%-8%. In some exemplary embodiments according to the present disclosure, the Ni-based alloy may include W, on a weight basis, about 6%, about 6.5%, about 7.0%, about 7.5%, about 8.0%, about 8.5%, or about 9.0%. In some exemplary embodiments according to the present disclosure, the Ni-based alloy may include W, on a weight basis, about 7.1%, about 7.2%, about 7.3%, about 7.4%, about 7.5%, about 7.6%, about 7.7%, about 7.8%, or about 7.9%.

In some exemplary embodiments, the Ni-base alloy may include, on a weight basis, no more than 0.25% of Fe. In some exemplary embodiments, the Ni-based alloy may include about 0%, about 0.10%, about 0.11%, about 0.12%, about 0.13%, about 0.14%, about 0.15%, about 0.16%, about 0.17%, about 0.18%, about 0.19%, about 0.20%, about 0.21%, about 0.22%, about 0.23%, about 0.24%, or about 0.25% Fe. In an embodiment according, the Ni-based alloy may include no more than about 0.15% Fe.

The addition of Mo may improve the strength, hardness, toughness, creep resistance and creep strength of the Ni-based alloy. Mo may also benefit processability and corrosion resistance of the Ni-based alloy and strengthen the effects of other elements. In some exemplary embodiments, the Ni-based alloy may include between about 0% and about 2.0%, or between about 1.0% and about 1.5% of Mo. In some exemplary embodiments, the Ni-based alloy may include Mo, on a weight basis, about 0%, about 0.1%, about 0.2%, about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2.0%. In some exemplary embodiments according to the present disclosure, the Ni-based alloy may include about 1.0% Mo and may exhibit excellent mechanical properties.

C and B are boundary trace elements which, when segregate to grain boundaries, may improve the intergranular binding force and strengthen grain boundaries, thereby increasing creep strength, plasticity and low cycle fatigue life of the Ni-based alloy. However, when C and B are present in excess, carbon and boron compounds may form and then precipitate. Thus, the performance of the Ni-based alloy may not be further improved, but the cost may increase. In some exemplary embodiments, the Ni-based alloy may include C, on a weight basis, between about 0.07% and about 0.18%. In some exemplary embodiments according to the present disclosure, the Ni-based alloy may include about 0.07%, about 0.08%, about 0.09%, about 0.10%, about 0.11%, about 0.12%, about 0.13%, about 0.14%, about 0.15%, about 0.16%, about 0.17%, or about 0.18% C. In some exemplary embodiments according to the present disclosure, the Ni-based alloy may include B, on a weight basis, between about 0.005% and about 0.015%. In some exemplary embodiments according to the present disclosure, the Ni-based alloy may include about 0.005%, about 0.010%, or about 0.015% B.

To reduce cracking during machining, it may be necessary to reduce as much C content as possible. Thus, in some exemplary embodiments according to the present disclosure, the Ni-based alloy may include C, on a weight basis, between about 0.08% and about 0.12%. In some exemplary embodiments, the Ni-based alloy may include about 0.085%, about 0.095%, about 0.100%, about 0.105%, about 0.110%, or about 0.115% C. In some exemplary embodiments according to the present disclosure, the Ni-based alloy may include B, on a weight basis, between about 0.008% and about 0.012%. In some exemplary embodiments according to the present disclosure, the Ni-based alloy may include about 0.008%, about 0.009%, about 0.010%, about 0.011%, or about 0.012% B. This is because when B is present in the above range, liquefaction cracks generated when segregating to the liquid phase during solidification can be reduced.

In addition to the elements above, the rest of the Ni-based alloy may include Ni and some unavoidable incidental impurities. Ni is the matrix element of the Ni-based alloy. The amount of the incidental impurities depends on the actual production process. Generally, only minimal incidental impurities may exist when the alloy is produced. Incidental impurities may include, but not limited to, S, Mn, V, and Cu. Efforts may be made to control the weight percentage of S and the weight percentage of V as needed. When the weight percentage of S is high, the Ni-based alloy may become brittle, and S may also segregate to the alloy/oxide interface formed during oxidation. V has an adverse effect on the oxidation behavior of the alloy, which may cause the protective oxide film to fall off.

In some exemplary embodiments, the Ni-based alloy may be obtained by casting, that is, the Ni-based alloy ingot having the above-mentioned composition may be prepared. The preparation method of the Ni-based alloy ingot may be performed in manners known to those skilled in the art.

In some exemplary embodiments, the preparation process of Ni-base alloy may include: (1) preparing a composition including, on a weight basis, about 14%-17% Cr, about 4%-6% Al, about 1.0%-1.5% Ti, about 8%-11% Co, about 6%-9% W, about 0.5%-1.5% Ta, no more than about 0.25% of Fe, about 0-2.0% Mo, about 0.07%-0.18% C, about 0.01%-0.03% Zr, about 0.005%-0.015% B, the balance of Ni and incidental impurities, smelting and casting to obtain an ingot; (2) remelting the ingot, and cast it into a product with a specific shape and size, the product may be an engine valve; (3) employ appropriate heat treatment processes known to those skilled in the art to the product.

By employing commercially available analysis tools such as JMatPro®, various measurements on mechanical properties may be performed. The Ni-based alloy according to exemplary embodiments of the present disclosure (hereinafter "Q201") including, on a weight basis, about 15% of Cr, about 5% of Al, about 1.3% of Ti, about 9.5% of Co, about 7.5% of W, about 1.0% of Ta, about 0.13% of Fe, about 1.0% of Mo, about 0.1% of C, about 0.02% of Zr, about 0.01% of B, the balance being Ni and incidental impurities, is compared against various conventional alloys, such as K435, K452, IN713LC, V911, Mar-M246, and IN751.

Figure 2:
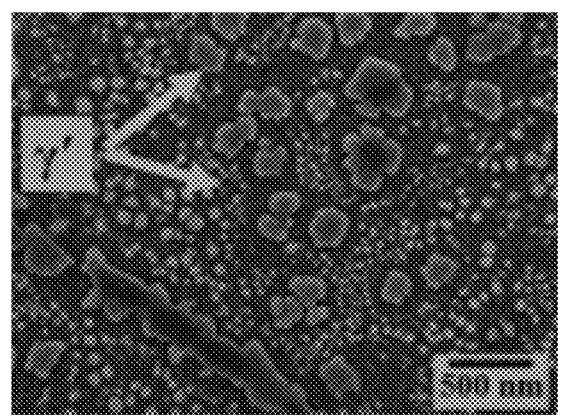
FIG. 2 is a scanning electron microscope photograph of the Ni-based alloy according to some exemplary embodiments of the present disclosure.

FIG. 2 shows the scanning electron micrograph of Q201 after being kept isothermally according to some exemplary embodiments of the present disclosure. As can be seen in the scanning electron micrograph, the microstructure of Q201 includes the γ' phase, while lack of undesirable phases such as TCP phase. γ' is the intermetallic compound $Ni_3(Al, Ti)$ distributed along the grain boundaries. It is the primary strengthening mechanism of high temperature nickel based super alloys. Higher the volume of fraction the γ' is, higher the material strength is, this is particularly true under high temperature operating conditions. When in a heat treat furnace or under some extreme operating conditions, γ' would dissolve in the solid matrix of the material; as a result, the strengthening mechanism that provides the desired high temperature strength disappears. The size of γ' is typically in the range of 10-300 nano meters in diameter; it has a strong function of heat treatment, particularly aging temperatures and time.

Figure 3:
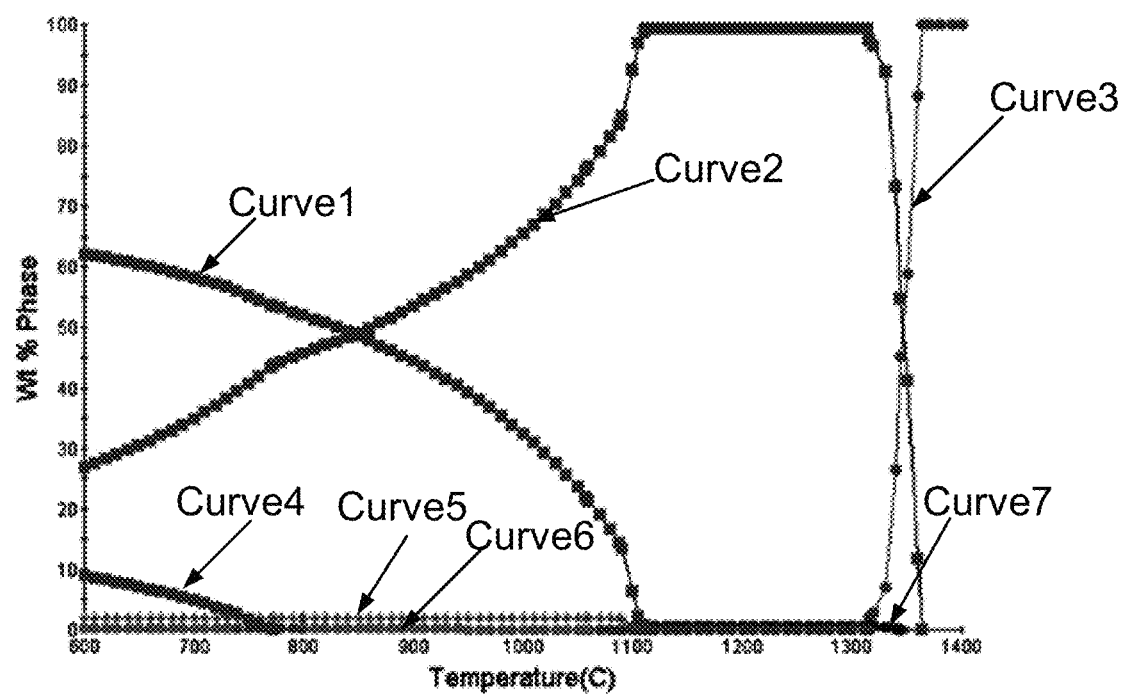
FIG. 3 shows the changes of various phases by weight with respect to change of temperatures of the Ni-based alloy according to some exemplary embodiments of the present disclosure.

FIG. 3 shows the changes of various phases by weight with respect to change of temperatures of Q201 according to some exemplary embodiments of the present disclosure. Curve 1 shows the change of weight percentage of γ' phase at different temperatures. The γ' phase weight percentage curve, i.e., curve 1, indicates that the weight percentage of the γ' phase of Q201 shows a downward trend with increasing temperature, which is consistent with other conventional alloys. At about 600° C., the weight percentage of γ' phase of Q201 is between about 60% and about 65%; at about 800° C., the weight percentage of γ' phase of Q201 is between about 50% and about 60%; at about 900° C., the weight percentage of γ' phase of Q201 is between about 40% and about 50%; at about 1,000° C., the weight percentage of γ' phase of Q201 is between about 30% and about 40%.

Figure 4:
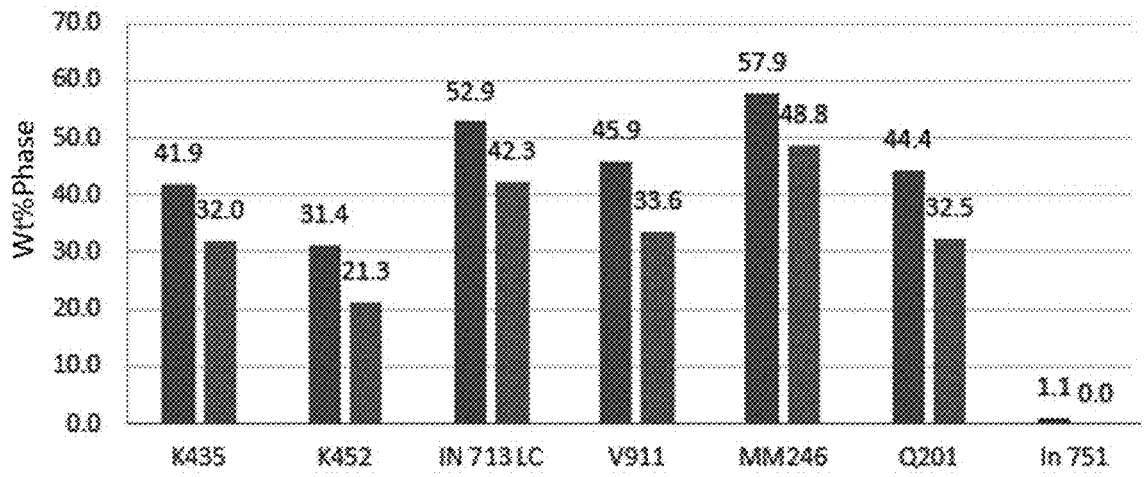
FIG. 4 shows the γ' weight percentages of conventional alloys and the Ni-based alloy according to exemplary embodiments of the present disclosure at 900° C. and 1,000° C.

FIG. 4 shows the γ' weight percentages of conventional alloys and Q201, respectively, at 900° C. and 1,000° C. The weight percentage of γ' phase of Q201 is slightly lower than that of MM246, which has the highest weight percentage of γ' phase. MM246, K435, K452, Inconel 713 LC are all cast alloys used on turbine blades. They have high strength but are difficult to forge using conventional valve forming methods. Inconel 751, which is the only current wrought alloy as shown in this figure, has essentially non-existent γ' at 900° C. and 1000° C. temperatures. Q201 can provide great strength due to its γ' content similar to other cast alloys for turbine blades, but it also has good formability for engine valves.

Figure 5:
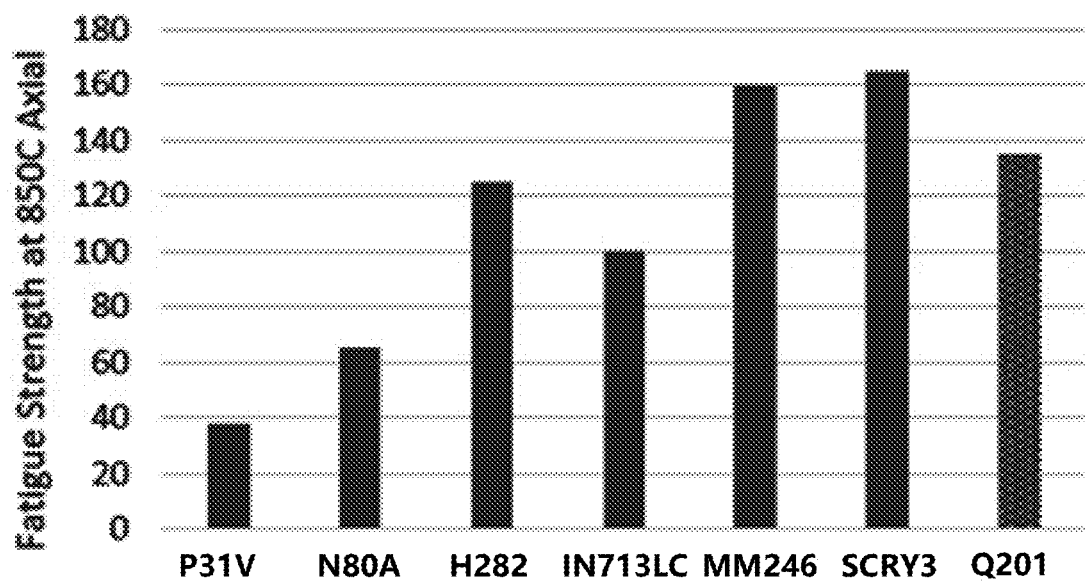
FIG. 5 shows the fatigue strength at 850° C. axial comparisons between convention alloys and the Ni-based alloy according to exemplary embodiments of the present disclosure, after 100M cycles.

FIG. 5 shows the fatigue strength at 850° C. axial tension and compression comparisons, with a stress ratio of R=0.05 between conventional valve alloys (P31V, N80A, H282) and turbine blade cast alloys (Inconel 713 LC, MM 246 and single crystal SCRY 3) and Q201, after 100M cycles. The fatigue strength of Q201 is slightly lower than that of single crystal alloy SCRY3 and turbine blade ally MM246. The material cost of Q201 make it not only suitable for valves, but also comparable with turbine blade cast alloys in strength.

Figure 6:
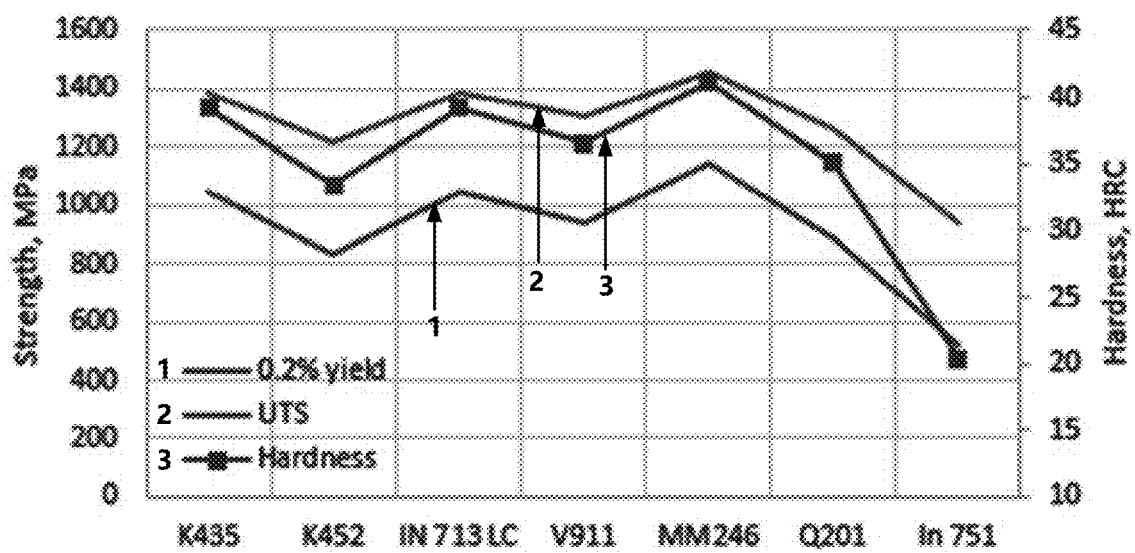
FIG. 6 shows the hardness and strength comparisons between conventional alloys and the Ni-based alloy according to exemplary embodiments of the present disclosure.

FIG. 6 shows the hardness, 0.2% yield strength, and ultimate tensile strength comparisons between conventional valve alloys (Inconel 751) and turbine blade cast alloys (K435, K452, Inconel 713 LC, and MM246) and Q201. Curve 1 shows the test results of 0.2% yield strength, curve 2 shows the test results of ultimate tensile strength, and curve 3 shows the test results of hardness of the alloys. The 0.2% yield strength, ultimate tensile strength and hardness of Q201 are equivalent to that of turbine blade cast alloys. Slightly lower hardness of Q201 makes it more suitable for manufacturing of engine valves, particularly the subsequent machining following forging.

The Ni-based alloy according to exemplary embodiments of the present disclosure can withstand a temperature of up to about 1,000° C. and have a service life at about 1,000° C. for about 10,000 to about 30,000 hours. Thus, the Ni-based alloys according to exemplary embodiments of the present disclosure may improve the high-temperature corrosion resistance and high-temperature oxidation resistance of the valve, resulting in extended service life comparing to valves made from conventional alloys. The valves including the Ni-based alloy according to exemplary embodiments of the present disclosure may also possess good mechanical properties and processability and may reduce manufacturing costs.

The foregoing descriptions are merely specific implementations of the exemplary embodiments of this disclosure, but the scope of protection of the exemplary embodiments of this disclosure is not limited thereto. A person skilled in the art may readily figure out various equivalent modifications or replacements within the technical scope disclosed in the exemplary embodiments of this disclosure, and all such modifications or replacements shall fall within the scope of protection of the exemplary embodiments of this disclosure. Therefore, the scope of protection of the exemplary embodiments of this disclosure shall be subject to the scope of protection of the claims.

What is claimed is:

1. A Ni-based alloy for a valve, comprising, on a weight basis:
   Cr: 14-17%;
   Al: 4-6%;
   Ti: 1-1.5%;
   Co: 8-11%;
   W: 6-9%;
   Ta: 0.5-1.5%;
   Fe: no more than 0.25%;
   Mo: 0-2%;
   C: 0.07-0.18%;
   Zr: 0.01-0.03%;
   B: 0.005-0.015%; and
   a balance of Ni, wherein
   the valve includes a valve head and a valve stem attached to the valve head.

2. The Ni-based alloy of claim 1, comprising 30%-40% of a γ' phase, at 1,000° C.

3. The Ni-based alloy according to claim 1, wherein Cr is 14.5-15.5%.

4. The Ni-based alloy according to claim 1, wherein Al is 4.5-5.5%.

5. The Ni-based alloy according to claim 1, wherein Ti is 1.25-1.4%.

6. The Ni-based alloy according to claim 1, wherein Zr is 0.015-0.025%.

7. The Ni-based alloy according to claim 1, wherein Ta is 0.55-1.25%.

8. A Ni-based alloy, comprising, on a weight basis:
Cr: 14.8-15.2%;
Al: 4.8-5.2%;
Ti: 1.28-1.35%;
Co: 9-10%;
W: 7-8%;
Ta: 0.85-1.15%;
Fe: no more than 0.15%;
Mo: 1.0-1.5%;
C: 0.08-0.12%;
Zr: 0.018-0.022%;
B: 0.008-0.012%; and
a balance of Ni.

9. The Ni-based alloy of claim 8, comprising, on a weight basis:
Cr: 15%;
Al: 5%;
Ti: 1.3%;
Co: 9.5%;
W: 7.5%;
Ta: 1.0%;
Fe: no more than 0.13%;
Mo: 1.0%;
C: 0.1%;
Zr: 0.02%;
B: 0.01%; and
a balance of Ni.

10. A valve, comprising:
a valve head;
a valve stem attached to the valve head,
wherein the valve includes a Ni-based alloy include, on a weight basis:
Cr: 14-17%,
Al: 4-6%,
Ti: 1-1.5%,
Co: 8-11%,
W: 6-9%,
Ta: 0.5-1.5%,
Fe: no more than 0.25%,
Mo: 0-2%,
C: 0.07-0.18%,
Zr: 0.01-0.03%,
B: 0.005-0.015%, and
a balance of Ni.

11. The valve of claim 10, wherein the Ni-based alloy comprising 30-40% of a γ' phase, at about 1,000° C.

12. The valve of claim 10, wherein the Ni-based alloy comprising 14.5-15.5% Cr.

13. The valve of claim 10, wherein the Ni-based alloy comprising 4.5-5.5% Al.

14. The valve of claim 10, wherein the Ni-based alloy comprising 1.25-1.4% Ti.

15. The valve of claim 10, wherein the Ni-based alloy comprising 0.015-0.025% Zr.

16. The valve of claim 10, wherein the Ni-based alloy comprising 0.55-1.25% Ta.

17. The valve of claim 10, wherein the Ni-based alloy includes, on a weight basis:
Cr: 14.8-15.2%,
Al: 4.8-5.2%,
Ti: 1.28-1.35%,
Co: 9-10%,
W: 7-8%,
Ta: 0.85-1.15%,
Fe: no more than 0.15%,
Mo: 1.0-1.5%,
C: 0.08-0.12%,
Zr: 0.018-0.022%,
B: 0.008-0.012%, and
a balance of Ni.

18. The valve of claim 10, wherein the Ni-based alloy includes, on a weight basis:
Cr: 15%,
Al: 5%,
Ti: 1.3%,
Co: 9.5%,
W: 7.5%,
Ta: 1.0%,
Fe: no more than 0.13%,
Mo: 1.0%,
C: 0.1%,
Zr: 0.02%,
B: 0.01%, and
a balance of Ni.

19. The valve of claim 10, wherein the valve is an intake valve.

20. The valve of claim 10, wherein the valve is an exhaust valve.

* * * * *